United States Patent [19]
Matsunaga

[11] 4,321,522
[45] Mar. 23, 1982

[54] VEHICLE STARTING METHOD

[75] Inventor: Iwao Matsunaga, Chicago, Ill.

[73] Assignee: Mitsubishi Jukogyo Kabushiki Kaisha, Tokyo, Japan

[21] Appl. No.: 134,306

[22] Filed: Mar. 26, 1980

[51] Int. Cl.[3] ........................... H02J 7/00; B60L 1/02

[52] U.S. Cl. ........................................ 320/2; 219/209; 290/50; 307/10 R; 320/35

[58] Field of Search ..................... 320/2, 35, 36, 7, 15; 290/50; 219/202, 209, 205; 307/10 R, 48 X

[56] References Cited

U.S. PATENT DOCUMENTS

| | | | |
|---|---|---|---|
| 3,649,366 | 3/1972 | Jordan et al. | 219/209 X |
| 3,778,632 | 12/1973 | Sarbacher | 307/48 X |
| 3,798,072 | 3/1974 | Anderson | 290/50 X |
| 4,004,208 | 1/1977 | Tamminen | 320/7 X |
| 4,081,737 | 3/1978 | Miyahara | 219/209 X |

*Primary Examiner*—Robert J. Hickey
*Attorney, Agent, or Firm*—Wegner, Stellman, McCord, Wood & Dalton

[57] ABSTRACT

A method of starting the engine of a vehicle, such as an automobile, over a wide range of ambient temperatures, such as in cold temperatures below 32° F. and warm temperatures above 32° F. The method includes the steps of energizing the starter motor of the vehicle from the vehicle battery only and starting the vehicle at warm temperatures, and providing an auxiliary battery connected in combination with the vehicle battery for starting the vehicle at cold temperatures. The invention comprehends maintaining the auxiliary battery warm separate from the vehicle during low ambient temperature conditions when the vehicle is not in use. Alternatively, the invention comprehends utilizing a small, low capacity battery which may be incapable of starting the vehicle when the battery is at the cold temperature, but which may itself start the vehicle when the battery is at warm temperatures. The invention comprehends providing such a battery is a lightweight, readily installable and disconnectable form so as to permit maintaining the battery warm when the ambient temperatures are below 32° F. The invention further comprehends the provision of apparatus for use in carrying out the above discussed methods.

6 Claims, 5 Drawing Figures

FIG. 1
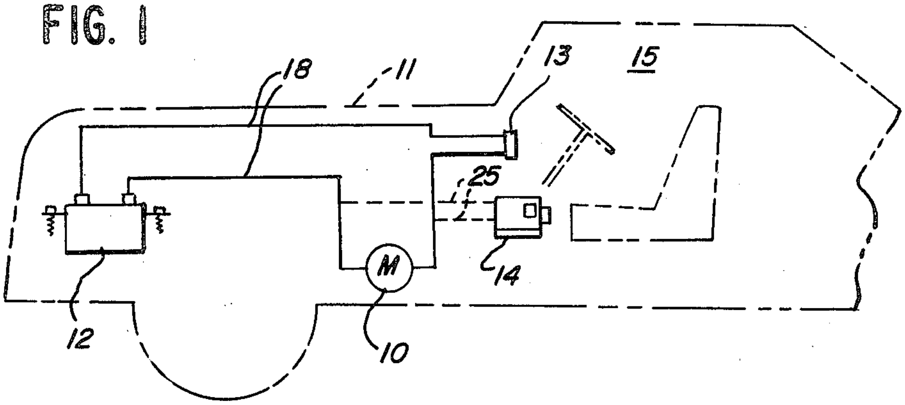
FIG. 2
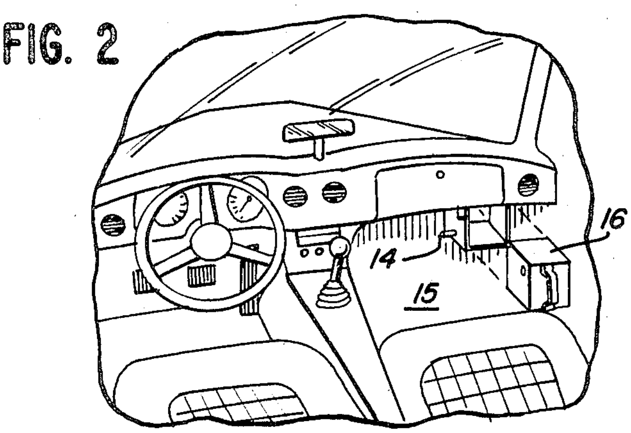
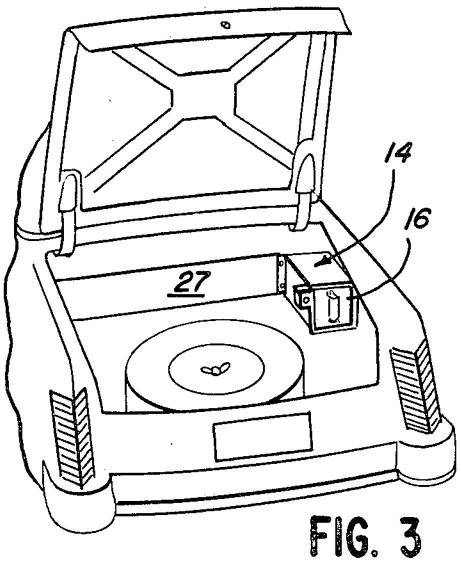
FIG. 3
FIG. 4
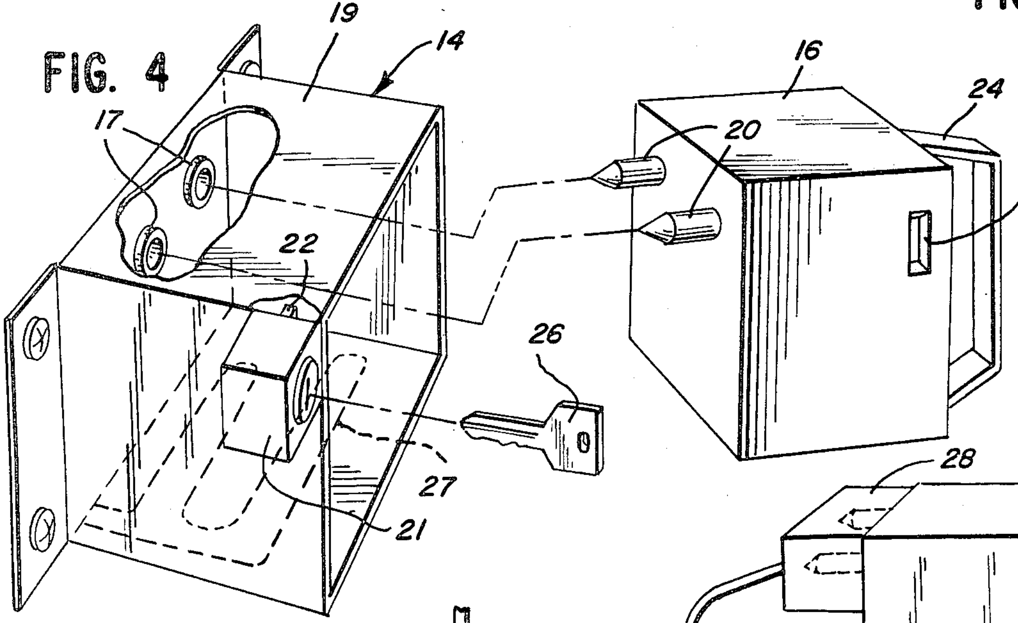
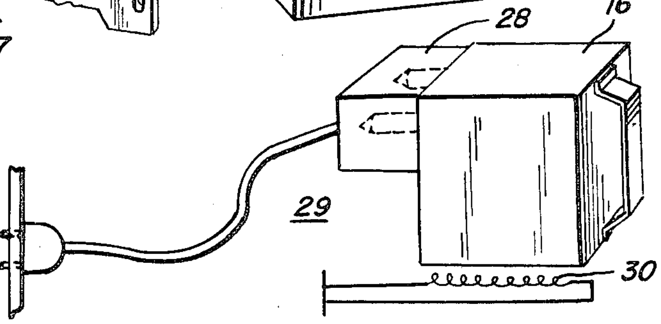
FIG. 5

VEHICLE STARTING METHOD

BACKGROUND OF THE INVENTION

1. Field of the Invention

This invention relates to the starting of vehicle engines and in particular to a method of starting an engine over a wide range of ambient temperatures and improved apparatus for carrying out the method.

2. Description of the Background Art

The use of an electrical starting motor powered by a storage battery is well known in the vehicle art. A problem arises in such use, however, in that such vehicles are often required to operate over a wide range of ambient temperature conditions. It is well known that a storage battery, such as of the conventional lead acid type, has reduced power capacity at lowered temperatures. Thus, it is conventional to provide a battery for a vehicle having an excess capacity when utilized at high temperatures so that the battery may function suitbly to start the engine of the vehicle by means of the starter motor also at low temperatures.

A number of different systems have been developed over the years utilizing auxiliary batteries for electrical combination with the normal battery of the vehicle. Illustratively, Patterson, Jr. U.S. Pat. No. 1,924,959, shows a storage battery apparatus wherein the battery is provided with an extra call and a switch for connecting the extra cell either in series or in parallel with the normal cell.

U.S. Pat. No. 2,335,526 of Mitchell shows an electrical system utilizing a pair of 6-volt batteries which may be selectively connected in parallel or in series by a magnetic switch.

In Bruno U.S. Pat. No. 2,730,630, a dual storage battery system is illustrated wherein the user may use either one of the batteries or use both batteries in parallel as desired.

In Jones U.S. Pat. No. 3,105,909, a battery booster is shown wherein a smaller voltage battery is mounted in a rack secured beneath the hood of the car by screw means.

In U.S. Pat. No. 3,165,689, Elroy E. Hughes shows a storage battery device wherein a momentary contact switching means is provided for controlling the connection of a booster battery from a remote point.

The Day U.S. Pat. Nos. 3,949,289 and 4,082,992, show a dual battery ignition and start system which utilizes a camper battery as an auxiliary battery when desired.

In U.S. Pat. No. 4,004,208, Pentti Tamminen shows a starting aid which consists of two small secondary batteries normally connected in parallel and charged together with the normal battery of the car.

In Reinhard et al U.S. Pat. No. 4,098,366, a battery installation is disclosed having a sealed enclosure so that the battery could be installed as in the passenger compartment of the vehicle.

SUMMARY OF THE INVENTION

The present invention comprehends an improved method and apparatus for starting the engine of a vehicle,, such as an automobile, over a wide range of ambient temperatures, including cold temperatures below 32° F. and warm temperatures above 32° F. The method and apparatus are adapted for use with such a vehicle having an electrically operated starter motor. In one form, the method and apparatus are adapted for use with such a vehicle wherein an effectively permanently installed battery for energizing the starter motor is provided in the vehicle.

The method comprehended by the invention where such a permanently installed battery is provided includes the steps of energizing the starter motor from the battery only to start the vehicle at the warm temperatures, providing a small auxiliary battery, maintaining the auxiliary battery warm separate from the vehicle during low ambient temperature conditions when the vehicle is not in use, installing the warm auxiliary battery in the vehicle to augment the permanently installed battery to energize the starter motor under the low ambient temperature conditions, causing the auxiliary battery to be maintained warm again subsequent to discontinuation of use of the vehicle, and repeating the last two steps during subsequent periods of use and nonuse of the vehicle during low ambient temperature conditions.

Alternatively, the invention comprehends eliminating the relatively large and expensive normal permanently installed battery of the vehicle and substituting therefor a battery having a capacity preselected to energize the starter motor to start the vehicle substantially only when the battery is at a temperature above 32° F. In utilizing such a battery, the battery is maintained warm separate from the vehicle during low ambient temperature conditions when the vehicle is not in use. The battery is maintained warm when installed in the vehicle during use of the vehicle, and again subsequent to discontinuation of use of the vehicle by removing the battery and maintaining it warm in a heated space separate from the vehicle.

The invention comprehends the provision of apparatus for carrying out the above discussed methods.

In the apparatus, the battery is constructed to permit ready installation and removal from the vehicle which may be provided with suitable releasable retaining means for mounting the battery in the vehicle under low ambient temperature conditions.

The retaining means may include a quick-connect means for facilitated connection and disconnection of the auxiliary battery.

Means may be provided for charging the auxiliary battery when removed from the vehicle and retained in the heated space.

Means may be provided in association with the retaining means of the vehicle for locking the auxiliary battery thereto when installed in the vehicle.

The vehicle may include an ignition switch and the retaining means may be operated by the ignition switch to permit installation and removal only upon proper actuation thereof.

BRIEF DESCRIPTION OF THE DRAWING

Other features and advantages of the invention will be apparent from the following description taken in connection with the accompanying drawing wherein:

FIG. 1 is a fragmentary, schematic elevation of a vehicle providing with apparatus embodying the invention for use in carrying out the method of starting the engine of the vehicle of the invention;

FIG. 2 is a fragmentary perpsective view illustrating the mounting of the auxiliary battery in the passenger compartment of the vehicle;

FIG. 3 is a fragmentary perspective view illustrating the mounting of the auxiliary battery in the trunk compartment of the vehicle;

FIG. 4 is a perspective view partially broken away illustrating in greater detail the installation of the auxiliary battery in the retaining means of the vehicle; and FIG. 5 is a perspective view illustrating the step of recharging the battery in the warm space separate from the vehicle during nonuse of the vehicle.

DESCRIPTION OF THE PREFERRED EMBODIMENTS

In the exemplary embodiments of the invention as disclosed in the drawing, the starter motor 10 of a vehicle generally designated 11, such as a passenger automobile, is energized from a storage battery 12 which may comprise a main, effectively permanently installed battery as is conventionally employed in the automotive vehicles now in use throughout the world. As shown in FIG. 1, the vehicle may be provided with a conventional ignition key device 13 for energizing the electrical system of the vehicle and connecting the starter motor 10 suitably to the battery for effecting starting of the vehicle engine.

As discussed above, automotive vehicles may be operated over a wide range of temperatures, including cold temperatures below 32° F. and warm temperatures above 32° F.

The present invention comprehends the provision of a retaining means generally designated 14 illustratively provided within the passenger space 15 of the vehicle for releasably retaining an auxiliary battery 16. The retaining means includes means, such as connectors, 17 for providing automatic electrical association of the installed auxiliary battery 16 with the wiring 18 connecting the main battery 12 to the starter motor 10 so as to permit the use of the auxiliary battery in combination with the main battery in effecting the energization of the starter motor during low ambient temperature conditions.

As illustrated in greater detail in FIG. 4, in one exemplary embodiment, retaining means 14 includes a housing 19 adapted to receive the auxiliary battery 16. The connecting elements 17 comprise female elements adapted to receive complementary male connectors 20 when the battery 16 is positioned within the housing 19.

An auxiliary ignition switch 21 is mounted on the housing 19 and is provided with a locking element 22 which may be urged into a suitable complementary recess 23 in the auxiliary battery 16, as shown in FIG. 4, for locking the auxiliary battery in the retaining means housing 19 when installed in the vehicle.

As illustrated further in FIG. 4, battery 16 may be provided with a carrying handle 24 for facilitating the installation and removal thereof relative to the housing 19. Thus, battery 16 may be guided into the housing 19 with the male terminals 20 and complementary female terminals 17 effectively defining quick-connect electrical connecting means further facilitating the installation and removal.

In the illustrated embodiment, as shown in FIG. 1, the wiring 25 connecting connectors 17 with the wiring 18 of the main battery connects the auxiliary battery in parallel atherewith across the starter motor 10. As will be obvious to those skilled in the art, a series connection may be effected where it is desirable to raise the voltage rather than the current capacity of the battery system in effecting the energization of the starter motor.

As illustrated in FIG. 4, the auxiliary ignition device 21 may be arranged to be actuated by a key 26 similar to the conventional ignition key as for use with the ignition switch 13.

Referring to the embodiment of FIG. 3, in an alternative arrangement, the retaining means 14 may be mounted in the trunk compartment 27 of the vehicle so as to provide further security to the auxiliary battery, if desired.

The invention comprehends that the auxiliary battery be utilized in combination with the main battery only when the ambient temperature conditions are low so as to require the use thereof in providing sufficient starting power capacity under such low temperature conditions. As discussed above, the capacity of the main storage battery 12 decreases with decreasing temperatures. The invention comprehends that the main storage battery 12 may be preselected to have sufficient capacity to suitably energize starting motor 10 to start the engine only when the main battery is in warm ambient temperatures and to require the combination therewith of the auxiliary battery at low temperatures. Thus, the main battery may be substantially smaller and less costly than in the conventional vehicle where the main battery must be of a size to provide proper starting capacity over the entire range of ambient temperatures.

The auxiliary battery 16 may be relatively small and inexpensive by utilizing the auxiliary battery as a temporarily installed battery in the vehicle as by removing the auxiliary battery upon discontinuing use of the vehicle and maintaining it in a warm space when the ambient temperatures are low, e.g. below 32° F. or lower.

Further alternatively, the retaining means 19 may be provided with a small electrical heating coil 27 to maintain the auxiliary battery warm such as where the vehicle is temporarily not in use and in low ambient temperature conditions.

As shown in FIG. 5, the invention further comprehends the use of a small charging device 28 for charging the auxiliary battery 16 when it is being maintained warm as, in warm space 29, for subsequent booster use in the vehicle under low ambient temperature conditions, as discussed above. As shown, a small electric heater 30 may be used to heat the battery in space 29.

As the auxiliary battery may be made extremely small and lightweight, the transfer between the heated space 29 and vehicle retaining means 19 may be readily effected by any normal operator of the vehicle.

As the auxiliary battery is normally maintained warm when utilized to augment the main battery in starting the vehicle under low temperature conditions, the total capacity of both the main battery 12 and auxiliary battery 16 may be less than that required by a single main battery alone.

In summary, the invention comprehends an improved method of starting the engine of a vehicle over a wide range of ambient temperatures, including cold temperatures below 32° F. and warm temperatures above 32° F. where the vehicle includes an electrically operated starter motor and an effectively permanently installed main battery for energizing the starter motor. The method of the invention comprehends energizing the starter motor from the battery only to start the vehicle under the warm temperature conditions and providing an auxiliary battery which is used in combination with the main battery in starting the vehicle in cold temperatures. The auxiliary battery is maintained warm separate from the vehicle during low ambient temperature conditions when the vehicle is not in use and is installed in the vehicle to augment the permanently installed battery under the low ambient temperature conditions. The auxiliary battery is arranged to be readily removed from the vehicle upon discontinuation of use of the vehicle and brought into the warm space to permit repetitive use, as discussed above.

In a modified method of the invention, as where the vehicle is a relatively small vehicle, the battery may comprise the sole battery of the vehicle while yet having a sufficiently low weight to permit its facilitated installation and removal so as to permit maintaining the battery warm in the heated space during low ambient temperature conditions.

The invention comprehends the provision of mounting structure in the vehicle providing facilitated quick connection and disconnection of the battery relative to the normal battery system of the vehicle so that the battery can be readily utilized as a starting aid when necessary while yet permitting the vehicle to be operated in the normal manner at all times when the auxiliary battery operation is unnecessary.

The foregoing disclosure of specific embodiments is illustrative of the broad inventive concepts comprehended by the invention.

I claim:

1. The method of starting the engine of a vehicle over a wide range of ambient temperatures including cold temperatures such as below 32° F., and warm temperatures, such as 32° F., and above, said vehicle having an electrically operated starter motor and an effectively permanently installed battery for energizing the starter motor, said method comprising the steps of:

energizing the starter motor from said battery only to start the vehicle at warm temperatures;

providing a small auxiliary battery;

warming said auxiliary battery separate from the vehicle during cold ambient temperature conditions when the vehicle is not in use;

installing the warm auxiliary battery in the vehicle to augment the permanently installed battery to energize the starter motor under said cold ambient temperature conditions;

causing the auxiliary battery to be maintained at a warm temperature separate from the vehicle during cold ambient temperature conditions again subsequent to discontinuation of use of the vehicle; and repeating said last two steps during subsequent periods of use and nonuse of the vehicle during cold ambient temperature conditions.

2. The method of starting the engine of a vehicle of claim 1 wherein the auxiliary battery is caused to be charged while being warmed separate from the vehicle.

3. The method of starting the emngine of a vehicle of claim 1 wherein said vehicle defines a passenger space and said battery is installed in the vehicle at said passenger space for facilitated installation and removal in effecting the selective use thereof.

4. The method of starting the engine of a vehicle of claim 1 wherein said auxiliary battery is connected in parallel with said permanently installed vehicle battery during use thereof in the vehicle.

5. The method of starting the engine of a vehicle of claim 1 wherein said vehicle defines a trunk space and said battery is installed in the vehicle in said trunk space for facilitated installation and removal in effecting the selecting use thereof.

6. The method of starting the engine of a vehicle over a wide range of ambient temperatures including cold temperatures such as below 32° F., and warm temperatures such as 32° F., and above, said vehicle having an electrically operated starter motor, said method comprising the steps of:

providing a battery having a capacity preselected to energize the starter motor to start the vehicle substantially only when the battery is at a warm temperature;

maintaining said battery warm separate from the vehicle during cold ambient temperature conditions when the vehicle is not in use;

installing the warm battery in the vehicle to energize the starter motor under said cold ambient temperature conditions;

causing the battery to be warmed during use of the vehicle and to be maintained at a warm temperature separate from the vehicle during cold ambient ambient temperature conditions again subsequent to discontinuation of use of the vehicle; and repeating said last two steps during subsequent periods of use and nonuse of the vehicle during cold ambient temperature conditions.

* * * * *